US008775364B2

(12) United States Patent
Arkoudas et al.

(10) Patent No.: US 8,775,364 B2
(45) Date of Patent: Jul. 8, 2014

(54) MODEL-THEORETIC APPROACH TO DATA ANONYMITY AND INFERENCE CONTROL

(75) Inventors: Konstantine Arkoudas, West New York, NJ (US); Shoshana Loeb, Philadelphia, PA (US); Akshay Vashist, Plainsboro, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 246 days.

(21) Appl. No.: 13/465,424

(22) Filed: May 7, 2012

(65) Prior Publication Data
US 2013/0124452 A1  May 16, 2013

Related U.S. Application Data

(60) Provisional application No. 61/482,846, filed on May 5, 2011.

(51) Int. Cl.
*G06N 5/02*  (2006.01)
*G06F 21/00*  (2013.01)

(52) U.S. Cl.
CPC . *G06F 21/00* (2013.01); *G06N 5/02* (2013.01)
USPC ............................................... 706/56; 706/45

(58) Field of Classification Search
CPC .................................. G06F 21/00; G06N 5/02
USPC ....................................................... 706/56, 45
See application file for complete search history.

(56) References Cited

PUBLICATIONS

Mussell, et al., 'Mapping the "Mighty Maze:" the Nineteenth-Century Serials Edition' 19: Interdisciplinary Studies in the Long Nineteenth Century, 1 (2005), pp. 1-25.*
C. Farkas and S. Jajodia, "The Inference Problem: A Survey", SIGKDD Explor. Newsl. 4, pp. 6-11, 2002.
J. Hale, J. Threet and S. Shenoi, "A Practical Formalism for Imprecise Inference Control," Proceedings of the IFIP WG11.3 Working Conference on Database Security VII, North-Holland Publishing Co., Amsterdam, The Netherlands, pp. 139-159, 1994.
T. H. Hinke, H.S. Delugach and R.P. Wolf, "Iliad: An Integrated Laboratory for Inference Analysis and Detection," Proceedings of the Ninth Annual IFIP TC11 WG11.3 Working Conference on Database Security IX: Status and Prospects, Chapman and Hall, Ltd., London, UK, pp. 333-348, 1996.
L. Sweeney, "Foundations of Privacy Protection from a Computer Science Perspective," Proceedings, Joint Statistical Meeting, AAAS, Indianapolis, IN, 2000. http://dataprivacylab.org/projects/disclosurecontrol/paper1.pdf.
R. W.M. Yip, "A Data Level Database Inference Detection System," PhD Thesis, University of California Davis, 1998.

(Continued)

*Primary Examiner* — Wilbert L Starks
(74) *Attorney, Agent, or Firm* — Philip J. Feig (57) ABSTRACT

A system and method for secure data management is presented. The method comprises receiving a query, performing the query and obtaining answers to it, creating certain formulas representing the answers; and determining whether there is a minimum number of distinct models of these formulas conjoined with the relevant anonymity predicates along with previous answers and general background knowledge, and when that number of models does not exist, suppressing the answers. In one aspect, the method further comprises creating formulas encoding the information conveyed by the answer; and combining the formulas encoding the information with prior information.

7 Claims, 3 Drawing Sheets

(56) References Cited

PUBLICATIONS

S. Jajodia and C. Meadows, "Inference Problems in Multilevel Secure Database Management Systems," in M. D. Abrams and S. Jajodia and H.J. Podel (ed.), "Information Security: An Integrated Collection of Essays," IEEE Computer Society Press, pp. 570-584.

T.A. Su and G. Ozsoyoglu, "Data Dependencies and Inference Control in Multilevel Relational Database Systems," IEEE Symposium on Security and Privacy, pp. 202-211, 1987.

R.W. Yip and K. N. Levitt, "Data Level Inference Detection in Database Systems," In Proc. of the 11th IEEE Computer Security Foundations Workshop, pp. 179-189.

* cited by examiner

- Set $C \leftarrow \emptyset$, $\Gamma \leftarrow \emptyset$, $\tau \leftarrow \emptyset$, $violations \leftarrow false$.
- While $violations = false$, do:

1. Set $C' \leftarrow C$, $\Gamma' \leftarrow \Gamma$, $\tau' \leftarrow \tau$.
  2. Receive a query $Q$ from the user.
  3. Let $\phi_Q$ be the selection condition of $Q$ (this could be the constant $true$).
  4. Let $A$ be the answer to $Q$, consisting of a sequence of $m$ tuples corresponding to $m$ individuals $u_1, \ldots, u_m$ in $\mathcal{U}$.
  5. Let $c_1, \ldots, c_m$ be fresh constant symbols and set $\tau \leftarrow \tau[c_1 \mapsto u_1, \ldots, c_m \mapsto u_m]$.
  6. Set $\Gamma \leftarrow \Gamma \cup UC(C, \phi_Q, \{c_1, \ldots, c_m\}) \cup EC(A) \cup distinct(c_1, \ldots, c_m)$.
  7. Set $C \leftarrow C \cup \{c_1, \ldots, c_m\}$.
  8. For each anonymity signature $\sigma = ((a_1, \ldots, a_p), a, \phi(x))$ with degree $k$, do:
     - For each constant $c \in C$, construct the following *anonymity predicate* for $c$:
     $$\psi_c(x) \equiv \neg N_\sigma(c, \tau) \vee \left[a(c) = x \wedge x \neq \overline{w_a(A, \tau(c))}\right]$$
     - Let $C = \{c_1, \ldots, c_n\}$. Define $\psi(x_1, \ldots, x_n)$ as the conjunction
     $$\psi_{c_1}(x_1) \wedge \cdots \wedge \psi_{c_n}(x_n)$$
     where $x_1, \ldots, x_n$ are distinct fresh variables.
     - For $j = 2, \ldots, k$: Try to find a model $(w_j, (v_{1_j}, \ldots, v_{n_j}))$ for
     $$B \cup \Gamma \cup \{\psi(x_1, \ldots, x_n)\} \wedge \bigwedge_{i=1}^{n} \bigwedge_{j' < j} x_i \neq v_{i_{j'}}\}.$$

If successful, continue; otherwise set $violations \leftarrow true$ and go to step 9.
  9. If $violations = false$, return $A$. Otherwise, suppress $A$ and set $C \leftarrow C'$, $\Gamma \leftarrow \Gamma'$, $\tau \leftarrow \tau'$, $violations \leftarrow false$.

FIGURE 3

MODEL-THEORETIC APPROACH TO DATA ANONYMITY AND INFERENCE CONTROL

CROSS REFERENCE TO RELATED APPLICATIONS

The present invention claims the benefit of U.S. provisional patent application 61/482,846 filed May 5, 2011, the entire contents and disclosure of which are incorporated herein by reference as if fully set forth herein.

FIELD OF THE INVENTION

This invention relates generally to secure data management and more particularly to a model-theoretic approach to inference detection.

BACKGROUND OF THE INVENTION

The inference problem in databases (and in social networks too, in a slightly different guise) occurs when sensitive information is disclosed indirectly, via a series of ostensibly secure answers to queries. Even though each individual query answer may be properly authorized for disclosure (i.e., the user's clearance level may permit her to receive the answer), the answers may nevertheless collectively compromise sensitive information, in that the user may be able to infer from these answers information that she is not authorized to have, particularly when she combines the answers with some additional knowledge, e.g., metadata such as integrity constraints or functional dependencies, or domain-specific knowledge.

The problem has attracted a great deal of attention. Most approaches fall into two camps, static and dynamic. Static approaches analyze a database prior to querying and try to detect so-called "inference channels" that could result in inference-based leaks of sensitive information. When such channels are identified, the database is modified in order to eliminate them; typically the security levels of various attributes are raised accordingly. This usually results in over-classification: large portions of the data are classified as sensitive, and overall data availability is thereby decreased, making the database less useful. As a rather simplistic example, consider a database with three attributes, Name, Rank, and Salary. Suppose that we wish to keep secret the association between names and salaries, but we freely disclose the association between names and ranks, and between ranks and salaries. Given a functional dependency Rank→Salary that may be widely known, it is clear that the user could come to infer salaries from ranks. In the static approach, the solution would be to make the Rank a sensitive attribute.

Dynamic approaches, by contrast, attempt to detect potential inferences of sensitive information at query time. If no inference is detected, the regular answer to the query can be released. But if it is determined that potentially compromising inferences could be made on the basis of the answer (and other knowledge, such as previous answers, metadata, etc.), then the answer is not released; it is withheld, or suppressed, or generalized, and so on. Dynamic approaches have the benefit of being considerably more precise than static approaches. On average, data is more available under a dynamic approach because there is no need to be overly conservative ahead of time; protective measures are taken only if and when needed. The main drawbacks of dynamic approaches have been incompleteness and inefficiency. Incompleteness means that only a very restricted class of inferences could be detected; and inefficiency typically means that the detection was computationally expensive.

Given that the issue at hand is information inference, it would appear that logic-based techniques such as theorem proving might be of use. Indeed, theorem proving techniques could be (and have been) used to tackle the inference problem, roughly along the following lines: For any given time point t, let $A_t = \{a_1, \ldots, a_t\}$, $t \geq 1$, be the answers to all the queries that a given user has previously posed (up to time t). Further, let B be a set of background knowledge that the user can be reasonably expected to have. For instance, B could be a set of functional dependencies for the underlying database. Now, let $q_{t+1}$ be a new query, and let $a_{t+1}$ be the answer to it. An inference-blocking information-management system will decline to disclose $a_{t+1}$ if $A \cup B \cup \{a_{t+1}\} \vdash p$, where p is a sensitive proposition that should not be made available to this particular user (e.g., because her security clearance level is insufficient). Typically p is an atomic proposition that reveals the value of a sensitive attribute for a given individual, such as $$\text{salary}(\text{Tom}) = 70K \tag{1.1}$$

In other words, the new query will not be answered lithe answer could be used, in tandem with previous answers and background knowledge, to deduce some sensitive information item about someone.

There are two main drawbacks to this approach. First, usually there is no single proposition p that we wish to protect but many. For instance, we wish to prevent the disclosure of all sensitive attribute values for all individuals in a given database. At least in principle, there are a couple of ways of handling this problem. First, one might run a theorem-proving procedure such as resolution to completion, deriving not one but very many conclusions from $A \cup B \cup \{a_{t+1}\}$, and then checking to see if any sensitive proposition is among the conclusions. A slightly more targeted approach is to formulate a disjunctive proposition $p_1 \vee \ldots \vee p_n$ containing all the propositions whose secrecy we wish to maintain under the circumstances, and check whether $$A \cup B \cup \{a_{t+1}\} \vdash p_1 \vee \ldots \vee p_n \tag{1.2}$$

Neither formulation is particularly practical or elegant. But there is a second serious problem, namely, the answer $a_{t+1}$ might amount to a partial information disclosure. That is, it might not allow the user to deduce a particular sensitive proposition such as (1.1), i.e., a specific value for some individual's sensitive attribute, but it may nevertheless provide helpful information in that it might eliminate certain alternatives, thereby narrowing the pool of possible values for the attribute in question. For instance, suppose that we are dealing with a company database and that company rank is a sensitive attribute. Suppose further that company rank is either E, F, G, or H; and that the user knows that the company rank of a certain employee x is either F, G, or H. In reality, it is F. Now if the new query answer allows the user to eliminate H as a possibility, it is clear that it has given her some sensitive information, even though she remains unable to derive the actual database entry, rank (x)=F. The upshot is that a security breach may well occur even though (1.2) does not hold.

SUMMARY OF THE INVENTION

The present invention solves the problems discussed above. The inventive solution comprises a model-theoretic approach to inference detection that allows for a much more natural formulation of the problem and for much finer security-policy specification and inference control. The novel technique models the epistemic state of the user as a set of possible worlds, i.e., as a set of data models. The user's knowledge is expressed in a multi-sorted first-order logic that is propositionalized (restricted to a finite domain) over the database universe, and the models in question are models of this knowledge, in the standard sense of mathematical logic. A new notion of anonymity signatures, introduced herein, allows the precise specification of data associations to be protected, and then for each tuple of values for the so-called "identifying attributes" of an anonymity signature, the user should not be able to distinguish among at least k distinct values for the corresponding sensitive attribute of the signature, where k is a tunable parameter that can be given different values for different anonymity signatures. This is similar to the idea of k-anonymity, but the important difference is that the data itself need not be k-anonymous; rather, the epistemic state of the user should be consistent with at least k distinct values for any given sensitive attribute of any given individual. Thus the inventive technique can be used even if the data itself is not k-anonymous. Hence, partial information disclosures can be treated in a model-theoretic fashion, and inference detection can be mechanized and controlled by using efficient model builders to do a form of model counting.

A system for secure data management comprises a CPU and a module operable on the CPU to receive a query, to perform the query and obtain the answer to the query, to create certain formulas representing the answers; and to determine whether there is a minimum number of distinct models of these formulas conjoined with the anonymity predicate along with background knowledge and previous answers; when the required number of models does not exist, suppress the answers. In one aspect, the module of the system is further operable to create formula encoding the information conveyed by the answers; and to combine the formula encoding that information with prior information. In one aspect, the system can further comprise an input device operable to send the query to the CPU. In one aspect, the system can further comprise an output device operable to display the answers from the CPU.

A method for secure data management comprises receiving a query, performing the query and obtaining answers to it, creating a formula in accordance with the answers; and determining whether there is a minimum number of distinct models of that formula (conjoined with the relevant anonymity predicates, previous answers, and general background knowledge), as required by the anonymity signatures; and when that number of models does not exist, suppressing the answers. In one aspect, the method further comprises creating formulas encoding information based on the answers; and combining the formulas encoding information with prior formulas encoding prior answers, as well as certain kinds of general background knowledge.

A computer readable storage medium storing a program of instructions executable by a machine to perform one or more methods described herein also may be provided.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings:

FIG. 1 is an inventive model-theoretic algorithm in accordance with the present invention.

DETAILED DESCRIPTION

What does it mean to say that an agent x does not know the value v of an attribute A? As discussed in detail below, it can mean that there is at least one other value $v' \neq v$ such that $A=v'$ is consistent with what x knows. For example, suppose that A represents the results of a cancer biopsy for Alice, so that there are only two possible values for A: 0 (negative) and 1 (positive). Suppose that the actual value v is 0, i.e., the result is negative. What does it mean to say that x does not know this information? It can mean that there is another value v', distinct from v, such that $A=v'$ is consistent with what x knows. In this case, of course, $v'=1$. Accordingly, to say that x does not know the value of A is to say that $A=1$ is consistent with what x knows.

Further, suppose that x is a user querying a database and accumulating answers to those queries over time. Write $K_x$ to denote the set of all answers that x has received so far, and let B be a set of pertinent background knowledge that x might have a priori (B can be a null set). The answers given to x do not "leak" the value of A if and only if there is some v' such that $$K_x \cup B \cup \{A=v', v' \neq v\} \quad (2.0)$$

is consistent, that is, satisfiable. Therefore to determine whether the answers reveal the value of A one can try to find a model for the set (2.0)

We define an information system S as a finite set of objects $\mathcal{U}$ and a finite set of attribute names (or simply attributes) $\mathcal{A}$. We call $\mathcal{U}$ the universe of S. We use the letters u and A as variables ranging over $\mathcal{U}$ and $\mathcal{A}$, respectively. Associated with each attribute name $A \in \mathcal{A}$ is a unique computable domain of values V(A), the set of values for the attribute A. We write $\mathcal{V}$ for the union of all V(A), $A \in \mathcal{A}$. We assume that a fixed subset of the attributes are designated as sensitive; these are the attributes whose privacy we wish to protect (though this will be refined below). A model or possible world w of an information system is an assignment of a unique value to each attribute and object. More precisely, a possible world of S is a function $w: \mathcal{A} \times \mathcal{U} \rightarrow V$ with $w(A; u) \in V(A)$ for each $A \in \mathcal{A}$ $u \in \mathcal{U}$. When the world w is obvious or immaterial, we write A(u) as a shorthand for w(A; u).

A possible world of an information system can be depicted in tabular format. Note that only one information system, i.e., one data table is discussed herein. The invention can easily be extended to handle multiple tables. Moreover, a database with multiple tables can be transformed into one with a single "universal" table. Consider the following table:

|  | Name | Salary |
|---|---|---|
| $u_1$ | Tom | 50K |
| $u_2$ | Mary | 70K |
| $u_3$ | Peter | 40K |

This table can be viewed as the following possible world:
w(Name, $u_1$)=Tom, w(Salary, $u_1$)=50K
w(Name, $u_2$)=Mary, w(Salary, $u_2$)=70K
w(Name, $u_3$)=Peter, w(Salary, $u_3$)=40K A state M of an information system S is a non-empty set of possible worlds of S. The term state is meant to invoke the notion of an agent's epistemic state. In particular, the set of worlds in M are all and only the worlds that are considered possible on the basis of what is known by the agent in question. We need to model the user's epistemic state in order to control it properly. When the interaction first starts, the user's state will contain very many possible worlds because the user will be under-informed at that point. As the user obtains more and more answers to her queries, her epistemic state narrows: many possible worlds are eliminated and hence the state's information content increases. Essentially, we want to ensure that the epistemic state doesn't narrow too much along the sensitive dimensions. The objective, in other words, will be to ensure that at any given time during the interaction, the user's state has several possible worlds of a certain kind in it. This will be made precise below.

The syntax and semantics of a logic for reasoning about information systems (such as database tables) is now presented. We will be concerned with a first-order language L consisting of a finite set of sorts S, where S contains a distinct sort ind (for the universe of the information system) along with m distinct sorts $a_1; ::::; a_m$, where each $a_i$ corresponds to an attribute name. For each sort s∈S, the language also contains a (possibly empty) collection of constant symbols, $C_s$. We write $c_s$ as a typical constant of sort s. The language has a number of sorted function and relation symbols. Each function symbol has a unique sort profile associated with it, of the form $s_1 \times \ldots \times s_n \to s$, n>0, and each relation symbol also has a unique sort profile, of the form $s_1 \times \ldots \times s_n$. There is an identity symbol $=^s$ with profile sxs for every sort s. We usually drop the sort superscript and simply write =. At minimum there are m function symbols $a_1, \ldots, a_m$, where $a_i$ corresponds to attribute $A_i$ and has profile ind→$a_i$. Finally, for each sort s there is a countably infinite set of variables $X_s$ of sort s, where for any two distinct sorts $s_1$ and $s_2$, $X_{s1}$ and $X_{s2}$ are disjoint. We write $x_s$ as a typical variable of sort s. Terms t of sort s are defined as follows: any variable or constant of sort s is a term of sort s; and if $t_1, \ldots, t_k$ are terms of sorts $s_1, \ldots, s_k$, respectively, and f is a function symbol with profile $s_1 \times \ldots \times s_n \to s$, then $f(t_1, \ldots, t_k)$ is a term of sort s. Nothing else is a term of sort S. If we wish to emphasize that a term t is of sort s, we may write $t_s$ instead of just t. The atomic formulas of this logic are of the form $R(t^{s1}_1, \ldots, t^{sk}_k)$ for R with profile $s_1 \times \ldots \times s_k$. We also have the usual Boolean combinations, universal quantifications for all $x_s \Phi$, and existential quantifications for each $x_s \Phi$.

Since the sorts are fixed for a given information system, a language of the kind that is described here is completely determined by its constant, function, and relation symbols. Sort information can be omitted from constants and variables when the sorts in question are either obvious or immaterial. Free and bound variable occurrences are defined as usual. Formulas that are alpha-equivalent are regarded as identical. The notion of substitution is also defined as usual: $\Phi[t/x]$ (where both x and t are of the same sort) is defined as the formula obtained from $\Phi$ by replacing every free occurrence of x by t, taking care to rename bound variables as necessary to avoid variable capture. (Hence, substitution is properly defined modulo the equivalence classes of alpha-convertibility.) $\Phi(x_1, \ldots, x_n)$ is written for a formula that has $x_1, \ldots, x_n$ as its free variables.

An interpretation I for such a language is given with respect to an information system $S=(\mathcal{U} \cdot \mathcal{H})$. In particular, the sort ind is mapped to the universe $\mathcal{U}$, while each sort $a_i$ is mapped to $V(A_i)$. We write $s^I$ for the set that interprets the sort s. Constants are interpreted as usual: each constant $c_s$ is mapped to a unique element $c^I$ in $s^I$. A function symbol f: $s_1 \times \ldots \times s_n \to s$ is assigned a corresponding function $f^I: s_1^I \times \ldots \times s_n^I \to s^I$. This means that each attribute symbol $a_i$: ind→$a_i$ is mapped to a unique function $a_i^I: \mathcal{U} \to V(A_i)$. Also, each relation symbol R with profile $s_1 \times \ldots \times s_n$ is interpreted by a unique relation $R^I \subseteq s^I_1 \times \ldots \times s^I_n$. The interpretation of each equality symbol $=^s$ is always the identity relation on $s^I$.

A variable assignment ρ for an interpretation I is a functional finite set of ordered pairs of the form $(x_s; v)$ where $v \in s^I$. We write $\rho [x_s|\to v]$, for $v \in s^I$, for the assignment that is identical to ρ except that it maps $x_s$ to v; and we write $\rho [x_1|\to v_1, \ldots, x_n|\to v_n]$, as a shorthand for $( \ldots (\rho[x_1|\to v_{1]}) \ldots )x_n|\to v_n]$. Also, $[x_1|\to v_1, \ldots, x_n|\to v_n]$ is understood as $\phi[x_1|\to v_1, \ldots, x_n|\to v_n]$. We use this notation for any finite function, not just for variable assignments. The denotation of a term t with respect to a given interpretation I and assignment ρ, denoted $I_\rho(t)$, is defined by structural recursion: if t is a constant symbol c, then $I_\rho(t)=c^I$; if t is a variable x, then $I_\rho(t)$ is the value assigned to x by ρ, viewing the latter as a function (we assume that x is in the domain of ρ); and if t is of the form $f(t_1, \ldots, t_n)$, then $I_\rho(t)$ is $f^I(I_\rho(t_1), \ldots, I_\rho(t_n))$.

We write $I|=\rho \, \Phi$ to mean that the interpretation I satisfies the formula $\Phi$ with respect to ρ. This satisfaction relation is defined by the usual structural induction. We say that I satisfies ρ, written $I|=\Phi$, iff $I|=\rho\Phi$ for every assignment ρ.

We have seen that an interpretation I is given with respect to an information system S. Yet only some parts of I are truly dependent on the given S, while others are invariant across many different information systems. For instance, if the language contains the integers as a sort and the less than (<) relation on them as a relation symbol, then the interpretation of that sort and the corresponding relation presumably do not change across different information systems. If we factor out these invariant parts, we may then understand an interpretation I as encoding a possible world w of an information system. That is, the truly important parts of I are the functions $a^I_i$, that map each object u in the underlying universe to a particular attribute value in $V(A_i)$. This fixes a data table for the underlying system. Thus, we may understand an interpretation as a possible world of the underlying information system, writing, e.g., $w|=\rho\Phi$ to mean that the interpretation I corresponding to w (obtained from w in tandem with the invariant parts, such as the relations and functions corresponding to symbols such < and +) satisfies $\Phi$ with respect to ρ. And if M is a state (a collection of models), we will write $M|=\rho \, \Phi$ to mean that $w|=\rho \, \Phi$ for every w∈M. Likewise, $M|=\Phi$ will means that $M|=\rho \Phi$ holds for every ρ. Assuming a fixed invariant part for I, we understand a model for a formula $\Phi(x_1, \ldots, x_n)$ as a pair $(w, (v_1, \ldots, v_n))$ consisting of a world w as well as values $v_i$ from the appropriate domains for the variables $x_1; ::::; x_n$, such that $w|=_{[x1|\to v1, \ldots, xn|\to vn]}\Phi(x_1, \ldots, x_n)$.

In what follows we will assume a unique naming convention to the effect that for any language L associated with an information system S; for any element $z \in \mathcal{P} \cup \mathcal{U}$; and for any interpretation I of L; L contains a unique constant symbol z (of the appropriate sort) whose denotation under I is z, i.e., $z^I=z$. Finally, for any formula $\Phi$ and finite set Σ of constants of sort ind, we define the propositionalization of $\Phi$ with respect to Σ, written $\Phi|\Sigma$, as the formula obtained from $\Phi$ by skolemizing all existential quantifications, followed by expanding every universal quantification $\forall x_{ind}\Psi$ into the conjunction of all $\Psi[c/x_{ind}]$, for c∈Σ.

For a given (fixed) information system S, an anonymity signature for S is an ordered pair $$((A_1, \ldots, A_p), A) \qquad (EQ1)$$

where $(A_1, \ldots, A_p)$ is a sequence of attributes S and A is a sensitive attribute of S. We refer to $A_1, \ldots, A_p$ as the signature's identifying attributes and to A as the signature's sensitive attribute. Intuitively, a sequence of values $v_1, \ldots, v_p$, with $v_i \in V(A_i)$, either uniquely identifies an individual or makes it very likely that an individual can be identified, perhaps with the aid of additional information. For instance, a combination of a name and a social security number would uniquely identify any individual working in the United States. But as shown in other works, there are other combinations of attributes, which, while not necessarily uniquely identifying by themselves, would typically make it very easy to identify an individual when augmented with some publicly available external information. For instance, armed just with a zip code, gender, and a birth date, we can often (around 87% of the time) uniquely identify any individual in this country. Our definition of anonymity signatures is flexible enough to handle any sequence of attributes deemed to be identifying attributes. The objective is that for any tuple of values $(v_1, \ldots, v_p)$ given for the identifying attributes $A_1, \ldots, A_p$ in a signature of the form (EQ1), the user should not be able to determine the corresponding value for the sensitive attribute of A.

By taking advantage of the logic we specified above for a given language L, we can allow for a more flexible form of anonymity signature: we can define an anonymity signature as a triple instead of a pair, where the first two elements are as before, except that they are now expressed more formally as attribute sorts, and the third new element is a formula $(I)(x)$ of one free variable ranging over ind: $((s_1, \ldots, s_p); s; \Phi(x))$. The idea here is that we only wish to protect the value of the sensitive attribute s (for a given tuple of values for the identifying attributes) for those individuals x for which $\Phi$ holds. Suppose, e.g., that we have attributes Job and Salary, and we wish to protect the relationship from Job to Salary but only for managers. We can specify this with the following anonymity signature: ((job); salary; job(x)=manager) where job and salary are attribute sorts; job is an attribute function symbol; and manager is an attribute value. We can now define an anonymity policy for an information system S as a finite set of anonymity signatures of the above form, expressed in some logic L for S. To make policies more flexible, we may assume that each anonymity signature has a unique positive integer k associated with it.

A novel algorithm for inference control is now described and shown in FIG. 1. In this algorithm, fix an information system S, a language L (as specified above), and the invariant part of some interpretation I for L. We now describe the inventive, general algorithm for inference detection and control. First, some notational conventions: For any n terms $t_1, \ldots, t_n$ of the same sort, we define distinct$(t_1, \ldots, t_n)$ as the conjunction stating that any two terms $t_i$ and $t_j$ with $i \neq j$ are distinct. Also, in what follows $w_0$ will refer to the "real world," namely, the world corresponding to the actual database. Although the user does not have direct access to that world, our algorithm does, and we take advantage of that fact. By a constant mapping z we mean a finite function from constant symbols of sort ind to the universe $\mathcal{U}$ of S. Our unique algorithm will maintain a dynamically growing set of such constant symbols C and a corresponding mapping $\tau: C \to \mathcal{U}$.

Next, let $\sigma = ((a_1, \ldots, a_p), a, \Phi, (x))$ be an anonymity signature, and let c be a constant symbol in C. We define $N_\sigma(c, \tau)$ as follows:

$$N_\sigma(c, \tau) = \Phi[c/x] \bigwedge_{i=1}^{p} a_i(c) = \overline{w_0(A_i, \tau(c))}$$

where c is in the domain of $\tau$ ($A_i$ is the attribute name in $\mathcal{A}$ corresponding to the function symbol $a_i$). We call $N_G(c, \tau)$ the identifying sentence for c, w, r, t, $\sigma$, $\tau$. Our novel algorithm is parameterized over a finite set of formulas B containing a priori or background knowledge about the database, which must be consistent with the real world.

A key part of the algorithm is step 6 of FIG. 1, where we compute what we call the existential and universal "closures" of the query answer. Intuitively, these closures capture the logical content of the query answer, A; we explain them with the aid of an example. Consider a database called Personnel with the following contents:

|       | Name   | Age | Salary | Job          |
|-------|--------|-----|--------|--------------|
| $u_1$ | Albert | 28  | 50K    | Receptionist |
| $u_2$ | Betty  | 25  | 60K    | Engineer     |
| $u_3$ | Calvin | 35  | 70K    | Engineer     |

Now consider the following SQL query:
Select Name, Age
from Personnel
where Age<30;

The answer to this query is a set of tuples, namely, (Albert, 28) and (Betty, 25). As indicated in step 5 in FIG. 1, we introduce fresh constant symbols to refer to the individuals corresponding to the tuples in this answer. In this case, since we have two tuples, we introduce two fresh constants, let's say $c_4$ and $c_5$, with $c_4$ corresponding to $u_1$ and $c_5$ to $u_2$ (we keep track of this correspondence in the mapping $\tau$). This answer conveys or tells us, in logical terms at least the following two things. One, there are two individuals in the information system, one whose name is Albert and whose age is 28; and one whose name is Betty and whose age is 25. Since $c_4$ and $c_5$ are (fresh) names for these individuals, we can express this information by the following conjunction:

name($c_4$)=Albert^age($c_4$)=28^ name($c_5$)=Betty^age($c_5$)=25

We call this the existential closure of the answer. We write EC(A) to denote the existential closure of any query answer A.

Two, the answer also tells us that these are the only individuals whose age is less than 30. More precisely:

$\forall x_{ind}: \text{age}(x_{ind}) < 30 \Rightarrow x_{ind} = c_4 \lor x_{ind} = c_5$ We call this the universal closure of the answer. Since we do not want to have unrestricted quantifiers in our formalization, we propositionalize this closure by replacing $x_{ind}$ by every constant symbol previously introduced by our algorithm. For instance, suppose that the previously introduced constants are $c_1$, $c_2$, and $c_3$. Then the universal closure of this answer will be expressed by the following three formulas: age$(c_i)<30 \Rightarrow c_i = c_4 \lor c_i = c_5$, i=1, 2, 3. In general, for any two sets of constants C and C' and any selection condition $\Phi$, we define $$UC(C, \emptyset, C') = \left\{ \emptyset(c) \Rightarrow \bigvee_{c' \in C'} c = c' \mid c \in C \right\}$$

The set C can be thought of as containing all previously introduced constants (for previous query answers), while C' can be viewed as the set of new constants (corresponding to the latest query answer).

Thus, with every new query answer, the user's slice of the universe keeps expanding—new constant names are introduced to denote the individuals corresponding to the answer's tuples. (Some of these new constants, of course, might denote individuals named by previously introduced constants.) The reasoning modeled by our algorithm is carried out with respect to this dynamically expanding universe. This restriction to a finite (but dynamically expanding) slice of the universe makes the algorithm practical. The restriction is sensible because the user reasons about the information that she has received, which pertains only to the individual tuples in the query answers.

It should be noted that both loops in the algorithm are essentially constant-time. First, on step 8 in FIG. 1: in practice there is often only one anonymity signature of interest, so this outer loop will often be executed only once. Then, on the third step inside step 8 ("For j=k"): This inner loop will be iterated only k−1 times. In particular, if k=2, then the loop will only be executed once. Thus, if there is only one anonymity signature with degree k=2, there will be no iteration at all—the procedure becomes a straight-line algorithm in that case. The ease k=2, in fact, corresponds essentially to the theorem-proving formulation.

Note the importance of naming: the presence of the identifying sentence $N_\alpha(c, \tau)$ in the definition of the anonymity predicate $$\psi c(x) \equiv \neg N_\alpha(c,\tau) \vee [a(c)=x \wedge x \neq \overline{w_o(A,\tau(c))}]$$

is significant, because we do not want to preclude the release of a sensitive attribute value as long as the corresponding individual is not identifiable.

The correctness of the algorithm is perhaps easier to see in the case of k=2. Let us say that a model-finding algorithm is sound iff it never produces an incorrect answer, namely: if it claims that a given set of formulas has no model, then the set in question is indeed unsatisfiable; and if it outputs a putative model for a given set of formulas, then that answer is indeed a model for the given formulas. And such an algorithm is complete iff it always terminates and produces an output, for any given (finite) set of formulas.

Theorem 1: Assume there is only one anonymity signature a with degree k=2, and assume the algorithm in FIG. 1 uses a sound and complete model finder in step 8. Then the variable violations becomes true iff the value of the sensitive attribute for at least one individual in the query answers has been leaked, i.e., iff there is a constant c∈C such that $$B \cup \Gamma \models N_\alpha(c,\tau) \wedge a(c) = \overline{w_o(A,\tau(c))}$$

PROOF: In one direction, suppose that violations becomes true for some query. Since k=2, the loop variable j=2 in step 8 of FIG. 1 must have only assumed the value 2, which means that the model finder was unable to find a model for $$B \cup \Gamma \cup \{\Omega(x_1, \ldots, x_n)\} \quad (3)$$

By the model finder's soundness, it follows that (3) is unsatisfiable, which is to say that $$B \cup \Gamma \models \neg \Psi(x_1, \ldots, x_n) \quad (4)$$

But $\Psi$ is just a conjunction of $\Psi_{ci}$ for i=n, where n is the total number of constant symbols introduced up to that point. Hence, by (4) and DeMorgan's we get $$B \cup \Gamma \models \text{for each } i=1 \ldots n, \neg \Psi_{ci}(x_i) \quad (5)$$

Therefore, there is some i∈{1, ..., n} such that $$B \cup \Gamma \models \neg \Psi_{ci}(x_i)$$

and this, in turn, means precisely that $$B \cup \Gamma \models N_\alpha(c_i,\tau) \wedge a(c_i) = \overline{w_o(A,\tau(c_i))}$$

The converse direction is immediate: if (6) holds for some $c_i$ then $B \cup \Gamma \cup \Psi_{ci}(x)$ is unsatisfiable for some i, hence $B \cup \Gamma \cup \Psi(x_1, \ldots, x_n)$ is unsatisfiable. Therefore, by the model finder's completeness and soundness, it follows that the attempt to find a model on step 8 will fail, and therefore that violations will be set to true.

Both the result and the proof generalize to any number of anonymity signatures and any k>1: violations becomes true iff, for some c∈C, there are fewer than k−1 models for $B \cup \Gamma \cup \{\Psi_c(x)\}$ assigning distinct values to x.

Of course, there is no sound and complete model-finding algorithm for unrestricted first-order logic, so, as given, the procedure in FIG. 1 is not quite mechanically computable. However, there are sound, complete, and highly efficient model finders for quantifier-free fragments of first-order logic combining various useful theories that arise in practice. Such a model-finder would be more than complete enough for practical purposes, since most queries encountered in practice are expressible in such a fragment, including statistical queries such as sums, counts, and averages. A look at step 8 in FIG. 1 shows that a model finder is invoked on $$B \cup \Gamma \cup \left\{ \psi(x_1, \ldots, x_n) \wedge \bigwedge_{i=1}^{n} \bigwedge_{j' < j} x_i \neq v_{ij'} \right\}$$

From this input, only B, in general, may not be quantifier-less. However, for most sets of background knowledge that arise in practice, such as functional dependencies and integrity constraints, B can be propositionalized in a way that makes it amenable to SMT model finding, by computing $\Phi | C$ for every $\Phi \in B$.

Figure 2:
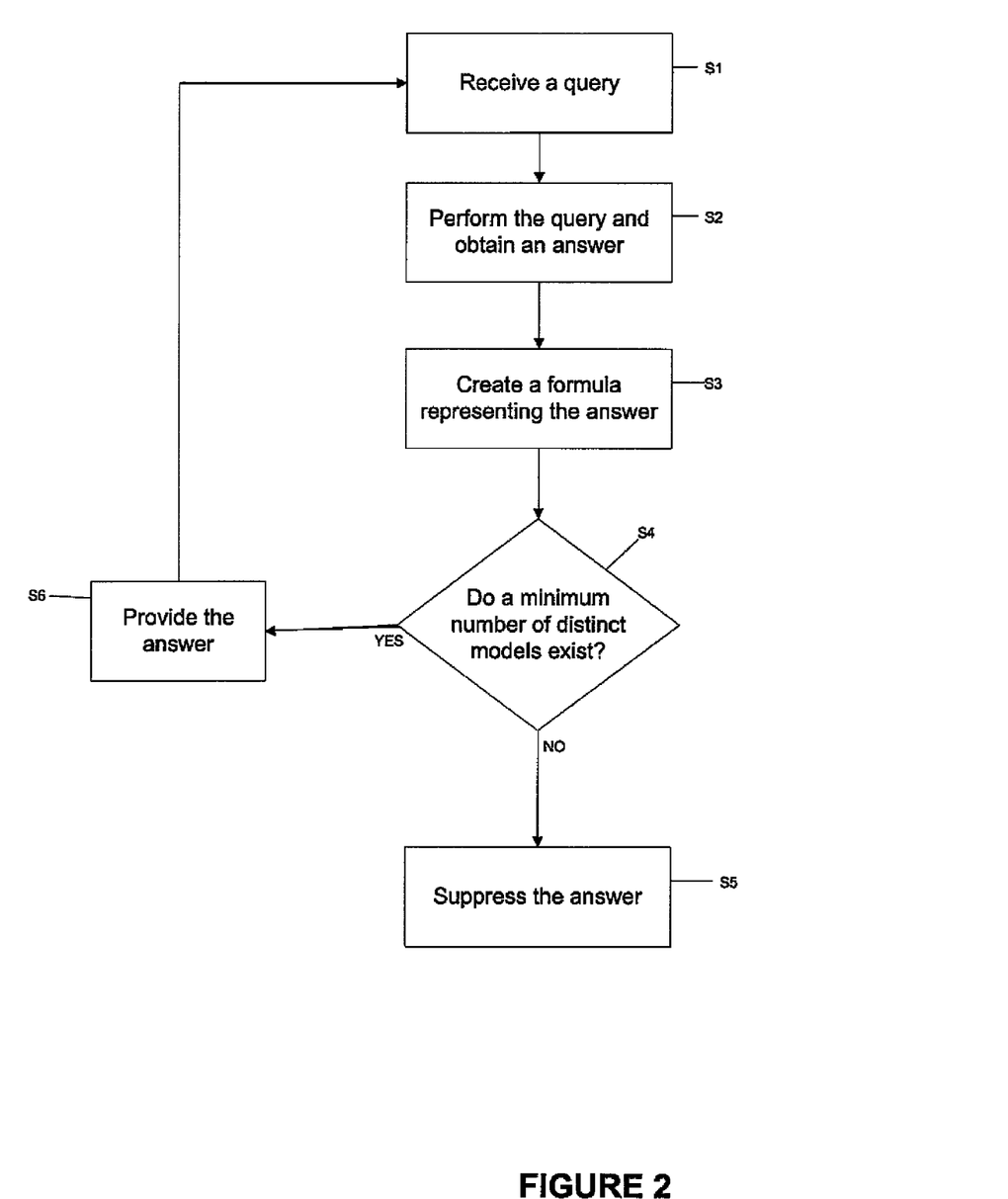
FIG. 2 is a flow diagram of the inventive method

FIG. 2 is a flow diagram of the inventive method. In step S1, receive a query. In step S2, perform the received query and obtain an answer to the query. In step S3, create a formula representing the answer. In step S4, determine whether a minimum number of distinct models exist. Note that these distinct models are models of the formula conjoined with relevant anonymity predicates, previous answers and background knowledge in accordance with anonymity signatures. When the minimum number of distinct models do not exist (S4=NO), then suppress the answer in step S5. Otherwise (S4=YES), provide the answer in step S6.

Figure 3:
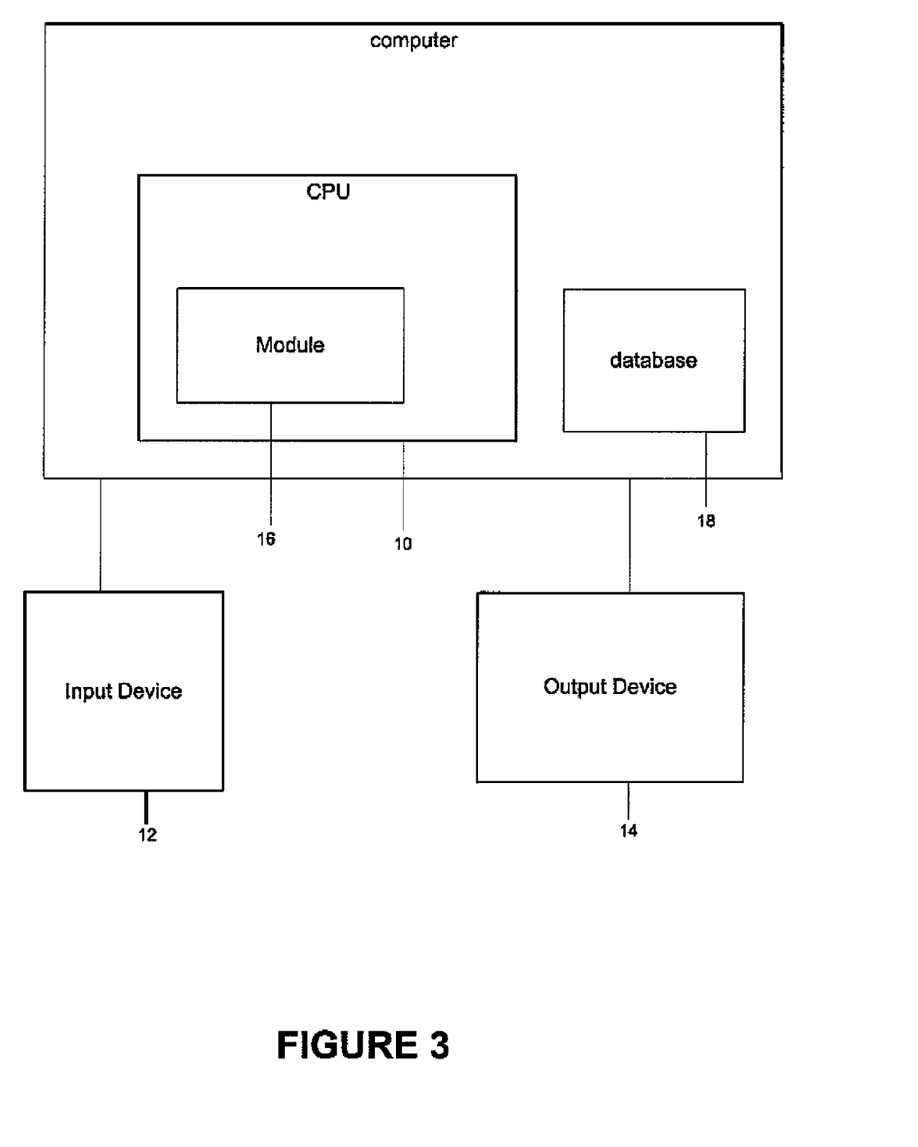
FIG. 3 is a schematic diagram of the inventive system.

FIG. 3 is a schematic diagram of an embodiment of the inventive system. In this embodiment, the system comprises a computer having a CPU 10, an input device 12 an output device 14, a module 16 executable by the CPU 10, and one or more databases 18. Multiple modules can exist in the system. The input device can be a mobile device, a laptop computer or any other such device. The output device can be a monitor, a laptop computer or any other such device.

The system can operate as follows. Using the input device 12, a user can input a query to the computer. The module 16 can perform, on the CPU 10, the query and the inventive algorithm described above and shown in FIG. 1. The module can return the output, if appropriate, to the output device 14.

An example of the inventive algorithm is now presented. In the exemplary embodiment, the model finder is the Yices SMT Solver Tool. The example revisits the Personnel database shown above. We first introduce a domain Ind for the universe of the information system, and datatypes Name and Job of the different names and jobs that appear in the database:

(define-type Ind)
(define-type Name (datatype Albert Betty Calvin))
(define-type Job (datatype Receptionist Engineer))

Now attribute functions are introduced that give the age, name, salary and job of a given individual.

(define age::→Ind int)
(define name::→Ind Name)
(define salary::→Ind int)
(define job::→Ind Job)

Assume the association between names and salaries is to be protected, so suppose there is one anonymity signature ((Name), Salary, true) with a degree of anonymity k=2. Suppose the user starts the interaction by making the following query Q:

Select Name, Age from Personnel where Age<30

Thus, the selection condition here is $\Phi_Q(x)=\text{age}(x)<30$. The answer to this query returns the two tuples (Albert, 28) and (Betty, 25). Two fresh constants $c_1$ and $c_2$ can be introduced to refer the individuals corresponding to these tuples, with the mapping $\tau=\{c_1 \to u_1, c_2 \to u_2\}$, and assert that these are distinct: (assert (not (=c1c2))). Then assert the existential closure of this answer:

(assert (and (=(name c1) Albert)
(=(age c1) 28)
(=(name c2) Betty)
(=(age c2) 25)))

Since there are no previously introduced constants, there is no universal closure for this answer. Thus, we have now reached step 8 (in FIG. 1) of the algorithm, and we proceed to construct the anonymity predicates for $c_1$ and $c_2$. The anonymity predicate for $c_1$ is as follows:

$$\Psi_{c1}(x) \equiv \neg N_\alpha(c_1;\tau) \vee [\text{salary}(c_1)=x \wedge x \neq 50]$$

where $N_\alpha(c_1\tau)\equiv$name $(c_1)=$Albert, and hence $$\Psi_{c1}(x) \equiv \text{name}(c_1)\neq \text{Albert} \vee [\text{salary}(c_1)=x \wedge x \neq 50]$$

Likewise, the anonymity predicate for $c_2$ is:

$$\Psi_{c2}(x) \equiv \text{name}(c_2)\neq \text{Betty} \vee [\text{salary}(c_2)=x \wedge x \neq 60].$$

Accordingly, the total anonymity predicate $\Psi(x_1, x_2)$ is the conjunction of $$\text{name}(c_1)\neq \text{Albert} \vee [\text{salary}(c_1)=x \wedge x \neq 50]$$

and $\text{name}(c_2)\neq \text{Betty} \vee [\text{salary}(c_2)=x \wedge x \neq 60].$ Moving to the last part of the algorithm, since in this case k=2, all we now need to do is to find a model for $\Psi(x_1, x_2)$. The model finder succeeds with the following result: (=x1 62), (=x2 61). This means that, for all the user knows at this point, the salary of $c_1$ (Albert) could be 62K and the salary of $c_2$ (Betty) could be 61K, and therefore the answer to this first query does not compromise the security policy and can be safely released.

Suppose the user continues with the query:

Select Age, Salary from Personnel where Age=28 which returns the single tuple (28, 50K). A new constant symbol $c_3$ can be introduced and $\tau$ can be updated to map $c_3$ to $u_1$. The existential closure of this answer is simply the conjunction of (=(age c3) 28) and (=(salary c3) 50). Since at this point there are previously introduced constants ($c_1$ and $c_2$), we need to compute and assert the universal closure of this answer. This closure is the conjunction of $$\text{age}(c_i)=28 \Rightarrow c_i=c_3$$

for i=1, 2. At this point, we are ready to try to find a model for the predicate $\Psi(x,y)$ that we defined above. This time, however, the model finder reports that the current context is unsatisfiable. Thus, the answer would be withheld or suppressed and the assertions would be retracted due to the second query and we would continue with the top-level loop.

Note that it is not necessary for the algorithm to completely withhold or suppress a query answer when a leak is detected. The answer could also be appropriately modified (e.g., generalized). The logical content of the new answer would then be extracted and added to Γ for the next iteration (see FIG. 1)

Various aspects of the present disclosure may be embodied as a program, software, or computer instructions embodied or stored in a computer or machine usable or readable medium, which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc. The system also may be implemented on a virtual computer system, colloquially known as a cloud.

The computer readable medium could be a computer readable storage medium or a computer readable signal medium. Regarding a computer readable storage medium, it may be, for example, a magnetic, optical, electronic, electromagnetic, infrared, or semiconductor system, apparatus, or device, or any suitable combination of the foregoing; however, the computer readable storage medium is not limited to these examples. Additional particular examples of the computer readable storage medium can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an electrical connection having one or more wires, an optical fiber, an optical storage device, or any appropriate combination of the foregoing; however, the computer readable storage medium is also not limited to these examples. Any tangible medium that can contain, or store a program for use by or in connection with an instruction execution system, apparatus, or device could be a computer readable storage medium.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server, and network of servers (cloud). A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method for secure data management, comprising steps of
receiving a query;
performing the query and obtaining an answer to the query;
creating a formula representing the answer;
determining whether a minimum number of distinct models exist, the distinct models being models of the formula conjoined with relevant anonymity predicates, previous answers and background knowledge in accordance with anonymity signatures; and
when the minimum number of distinct models do not exist, suppressing the answer.

2. The method according to claim 1, further comprising steps of:
creating formula encoding the information conveyed by the answer; and
combining the formula encoding the information with prior information.

3. A system for secure data management, comprising:
a CPU;
a module operable on the CPU, the module operable to receive a query, perform the query and obtain an answer to the query, create a formula representing the answer, determine whether a minimum number of distinct models exist, the distinct models being models of the formula conjoined with relevant anonymity predicates, previous answers and background knowledge in accordance with anonymity signatures; and when the minimum number of distinct models do not exist, suppress the answer.

4. The system according to claim 3, the module further operable to create formula encoding the information conveyed by the answer and combine the formula encoding the information with prior information.

5. The system according to claim 3, further comprising an input device operable to send a query to the CPU and an output device operable to display the answers from the CPU.

6. A computer readable storage medium storing a program of instructions executable by a machine to perform a method for secure data management, comprising steps of
receiving a query;
performing the query and obtaining an answer to the query;
creating a formula representing the answer;
determining whether a minimum number of distinct models exist, the distinct models being models of the formula conjoined with relevant anonymity predicates, previous answers and background knowledge in accordance with anonymity signatures; and
when the minimum number of distinct models do not exist, suppressing the answer.

7. The computer readable storage medium according to claim 6, further comprising:
creating formula encoding the information conveyed by the answer; and
combining the formula encoding the information with prior information.

* * * * *

UNITED STATES PATENT AND TRADEMARK OFFICE
CERTIFICATE OF CORRECTION

PATENT NO. : 8,775,364 B2
APPLICATION NO. : 13/465424
DATED : July 8, 2014
INVENTOR(S) : Arkoudas et al.

It is certified that error appears in the above-identified patent and that said Letters Patent is hereby corrected as shown below:

In the Specification

In Column 2, Line 20, delete "lithe" and insert -- if the --, therefor.

In Column 4, Line 35, delete " $\mathcal{A}$ " and insert -- $\mathcal{A}.$ --, therefor.

In Column 4, Line 45, delete " $\mathcal{A}$ " and insert -- $\mathcal{A},$ --, therefor.

In Column 7, Line 2, delete "art" and insert -- an --, therefor.

In Column 7, Line 26, delete "(I)(x)" and insert -- $\Phi(x)$ --, therefor.

In Column 8, Line 3, delete "$N_G(c,\tau)$" and insert -- $N_\sigma(c,\tau)$ --, therefor.

In Column 9, Line 18, delete "("For j=k"):" and insert -- ("For j= 2,...,k"): --, therefor.

In Column 9, Line 22, delete "ease" and insert -- case --, therefor.

In Column 9, Line 44, delete "a" and insert -- σ --, therefor.

In Column 9, Line 57, in Equation (3), delete "$B \cup \Gamma \cup \{\Omega(x_1,...,x_n)\}$" and insert -- $B \cup \Gamma \cup \{\Psi(x_1,...,x_n)\}$ --, therefor.

In Column 9, Line 63, delete "i=n," and insert -- i= 1,..., n, --, therefor.

In Column 11, Line 37, delete "$N_\sigma(c_1\tau)$" and insert -- $N_\sigma(c_1;\tau)$ --, therefor.

Signed and Sealed this
Nineteenth Day of May, 2015

Michelle K. Lee
*Director of the United States Patent and Trademark Office*